United States Patent [19]

Harrison et al.

[11] Patent Number: 5,246,553
[45] Date of Patent: Sep. 21, 1993

[54] TETRAVALENT TITANIUM ELECTROLYTE AND TRIVALENT TITANIUM REDUCING AGENT OBTAINED THEREBY

[75] Inventors: Stephen Harrison, Shawinigan; Mario Boucher, Shawinigan-Sud, both of Canada

[73] Assignee: Hydro-Quebec, Quebec, Canada

[21] Appl. No.: 847,657

[22] Filed: Mar. 5, 1992

[51] Int. Cl.$^5$ ............................................. C25C 1/06
[52] U.S. Cl. .................................................. 204/140
[58] Field of Search ...................................... 204/140

[56] References Cited

U.S. PATENT DOCUMENTS

| | | | |
|---|---|---|---|
| 4,312,721 | 1/1982 | Oehr | 204/78 |
| 4,313,804 | 2/1982 | Oehr | 204/93 |
| 4,536,377 | 8/1985 | Komatsu et al. | 260/396 |
| 4,632,762 | 12/1986 | Komatsu et al. | 260/396 |
| 4,639,298 | 1/1987 | Kreh et al. | 204/59 R |
| 4,647,349 | 3/1987 | Kreh et al. | 204/59 R |
| 4,670,108 | 6/1987 | Kreh et al. | 204/59 R |
| 4,701,245 | 10/1987 | Kreh | 204/78 |
| 4,794,172 | 12/1988 | Kreh | 204/78 |

FOREIGN PATENT DOCUMENTS

| | | | |
|---|---|---|---|
| 1132996 | 10/1982 | Canada | 260/396 |
| 1166600 | 5/1984 | Canada | 204/61 |
| 1191811 | 8/1985 | Canada | 204/53 |
| 0075828 | 9/1982 | European Pat. Off. | |

OTHER PUBLICATIONS

Comninellis, C. H. "Electrochemical production of ceric sulphate in concentrated H$_2$SO$_4$", Journal of Applied Electrochemistry, vol. 13 (1983) pp. 117–120.

Dalrymple, I. M. "An Indirect Electrochemical Process for the Production of Naphthaquinone" Journal of Applied Electrochemistry, vol. 13 (1986) pp. 885–893.

Kreh, Robert P. "Selective Oxidations with Ceric Methanesulfonate and Ceric Trifluoromethanesulfonate." Tetrahedron Letters, vol. 28, No. 10, (1987) pp. 1067–1068.

Pichaichanarong, P. "Simulation of a Mediated Electrochemical Process." Chem. Eng. Comm., vol. 94 (1990) pp. 119–130.

Spotnitz, R. M. "Mediated Electrosynthesis with Cerium (IV) in Methanesulphonic Acid." Journal of Applied Electrochemistry, 90(2) (1990) pp. 209–215.

Kreh, Robert P. "Aromatic Aldehydes, Ketones and Quinones by Mediated Electrooxidation." in Genders, J. David, *Electrosynthesis From Laboratory To Pilot, To Production*, Chapter 10, (1990).

*Primary Examiner*—T. M. Tufariello
*Attorney, Agent, or Firm*—Limbach & Limbach

[57] ABSTRACT

An electrolyte containing a tetravalent salt of titanium in a methanesulfonic acid solution. A reducing agent consisting of trivalent titanium in the same solution. A cell wherein the catholyte is the above electrolyte. The reduction of tetravalent titanium into trivalent titanium by electrolysis. Simultaneous reduction of tetravalent titanium into trivalent titanium and oxidation of trivalent cerium to tetravalent cerium by electrolysis is also disclosed. Reduction of organic compounds using trivalent titanium in methanesulfonic acid.

14 Claims, No Drawings

TETRAVALENT TITANIUM ELECTROLYTE AND TRIVALENT TITANIUM REDUCING AGENT OBTAINED THEREBY

BACKGROUND OF INVENTION (a) Field of the Invention

The present invention relates to a liquid electrolyte which can be used for carrying out chemical reductions. More particularly, the invention is concerned with a methanesulfonic catholyte containing a tetravalent salt of titanium which is dissolved in a methanesulfonic acid solution. The invention is also directed to an electrochemical process including the catholyte of the invention, an electrolyte process for the reduction of tetravalent titanium into trivalent titanium as well as the simultaneous oxidation of the reduced form of redox couple, when used as a reductant for organic molecules such as nitrobenzenes, sulfoxides or quinones. Finally, the invention pertains to improved methods for the reduction of chemical compounds using a solution of trivalent titanium in methanesulfonic acid.

(b) Description of the Prior Art

Redox reagents are compounds that can exist in an oxidized or reduced state. Usually, these compounds are transition metals such as iron, chromium, manganese, vanadium, etc. Great use has been made of these compounds in organic synthesis for the oxidation or reduction of reactive groups. Examples include the oxidation of methyl groups to aldehydes or acids, introduction of quinone groups to aromatic ring systems, the reduction of nitro groups to amines and the addition of hydrogen to unsaturated molecules.

The manufacture of anthraquinone from the chromic acid oxidation of anthracene, with subsequent re-oxidation of the chromic acid in an electrochemical cell is such an example. Such processes were used in the dyestuff industry in Germany as early as the turn of the century. Other processes involved the use of regenerated chromic acid to bleach montan wax, and the use of chromic acid to manufacture saccharine. Examples of using regenerated redox reagents abound in the literature of electrochemical synthesis. In some cases the redox reagents were added along with the organic substrate and the whole treated in an electrochemical cell. This is known as in-cell reaction In other cases, the reagent was prepared electrochemically in solution, mixed with the organic substrate in a separate treatment, to so-called ex-cell method. This application concerns this latter approach.

Regardless of which system of redox manipulation is involved, the role of the redox reagent is to react easily and efficiently with the electrode on the one hand and the normally insoluble organic substate on the other. The role of the redox is then in the case of oxidation that of the oxygen to the organic substrate and is itself reduced. The reduced redox form being both soluble and able to contact the anode in the cell without hindrance is then easily re-oxidised ready for a further reaction with the organic substrate. In this way, redox reagents are used to enhance reaction rate between a poorly soluble reagent and the electrochemical transfer of electrons which accompanies oxidation or reduction of all chemical compounds. Electron transfer occurs essentially at a two-dimensional surface; consequently, at the electrode, poor soluble reactions have statistically a much shorter period in the vicinity of this surface for such electron transfers to take place in the poorly soluble substrate.

Ideally, redox reagents are chosen for their ability to bridge the solubility gap between the reagent to be oxidized or reduced and the regenerating electrode. A further property of redox reagents is to be considered in the selection for a particular process, namely the redox potential. This may be considered as a measure of their ability on a thermodynamic scale to oxidize or reduce other materials.

In the past, metals such as iron or zinc have been used in the presence of acids such as hydrochloric in the Bechamp process to reduce nitrobenzenes such as p-nitrotoluene and p-xylidene to their respective amines. However, these processes produce large quantities of contaminated metal oxides which require disposal and are therefore technologies which are damaging to the environment. Another process which can be used to reduce nitrobenzenes and other nitrated compounds is the catalytic reduction with hydrogen. This technology, however, is capital-intensive and therefore dedicated equipment can only be justified for such a process when there is a large demand for the product.

The efficiency of the direct electrolytic reduction is inhibited by the low solubility of the nitrobenzenes in the aqueous electrolyte and the poor conductivity of non-aqueous electrolytes in which these compounds are soluble.

The electrolytic reduction of titanium(IV) to titanium(III) is well known in acid media, such as hydrochloric, sulphuric, etc. as is disclosed in prior art by Udupa and others.

In sulphate media, the faradaic efficiency is poor because of low solubility and in chloride media, it is difficult to find electrode material which can withstand the corrosive nature of the solution. On the other hand, it is well known to reduce nitrobenzenes at the cathode of electrolytic cells. The introduction of titanium(IV) to the electrolyte improves the faradaic efficiency of the reduction of nitrobenzenes. However, the low solubility of titanium(IV) in sulphate does not allow the ex-cell use of the then-reduced titanium(III).

The simultaneous generation of chromium and other redox agents [titanium] has been disclosed by Chaussard et al in Canadian Patent 1,191,811. However, chromium(VI) is a powerful oxidising agent, and due to its oxygen donating ability, it is less selective than cerium-(IV) which is a more powerful oxidising agent. Thus, chromium(VI) is a preferred oxidising agent for producing organic acids such as benzoic acid. Unfortunately, however, these acids are, for the most part, produced more economically by direct oxidation with oxygen under catholytic conditions.

SUMMARY OF INVENTION

It is an object of the present invention to provide an electrolyte containing tetravalent titanium enabling to produce trivalent titanium with improved faradaic yield.

It is another object of the present invention to provide an electrolytic process wherein the conversion of tetravalent titanium into trivalent titanium is achieved economically and with improved faradaic yield.

It is another object of the present invention to provide a method of electrocatalytic synthesis involving reduction reactions.

It is another object of the present invention to provide a catholyte enabling the simultaneous generation of useful products at the anode and cathode chemical reactions.

It is another object of the present invention to provide an electrolyte containing a tetravalent salt of titanium wherein the titanium salt is more soluble than the known titanium containing electrolyte.

It is another object of the present invention to provide an electrolytic process enabling to obtain high current efficiencies with high conversion into trivalent titanium.

It is another object of the present invention to provide an electrocatalyst containing trivalent titanium which is very stable in the presence of methanesulfonic acid.

These and other objects of the present invention may be achieved by providing an electrolyte comprising a tetravalent salt of titanium which is dissolved in a solution of methanesulfonic acid.

The invention also relates to an electrolytic process for the reduction of tetravalent titanium into trivalent titanium wherein the process is carried out with a catholyte as defined above.

The invention also relates to an electrolytic process for the simultaneous reduction of tetravalent titanium into trivalent titanium and oxidation of trivalent cerium into tetravalent cerium in the same electrochemical cell, wherein the anolyte comprises a trivalent cerium salt in solution in methanesulfonic acid and the catholyte comprises a tetravalent salt of titanium which is dissolved in a solution of methanesulfonic acid, the anolyte and catholyte being separated by a membrane, diaphragm, etc.

The invention also relates to a process for the reduction of organic compounds by reacting them with a solution of trivalent titanium in methanesulfonic acid.

DESCRIPTION OF PREFERRED EMBODIMENTS

The electrolyte according to the invention, is preferably used as a catholyte and the tetravalent salt of titanium is preferably selected from titanium oxysulfate, titanium tetrachloride and titanium oxymethanesulfonate, the oxysulfate being the most economically practical species.

The solution in which the tetravalent salt of titanium is dissolved is preferably an aqueous solution, which in practice may be 0.2 to 15 molar, most preferably between 2 and 5 molar of aqueous acid.

The concentration of the tetravalent salt of titanium may vary within a wide range, although a range of 0.4 to 1M or higher is preferred.

In operating the electrolytic cell according to the invention for the reduction of tetravalent titanium into trivalent titanium, the current density may vary, for example between about 100 and about 10,000 $Am^{-2}$, preferably between about 500 and 4000 $Am^{-2}$.

EXAMPLES

The invention is illustrated but not restricted by the following examples.

Example 1

Preparation of the catholyte: 96 parts of titanium oxysulfate was dissolved in a solution of methanesulfonic acid (1130 parts) to give a solution of 0.4M titanium(IV) in methanesulfonic acid (3.5M). The anolyte was simply methanesulfonic acid (3.5M) dissolved in water.

The electrolysis was carried out in a small plate and frame cell equipped with an anode of plantinized titanium, a cathode of copper and an ion exchange membrane (Nafion TM 417). The respective anolyte and catholyte were pumped simultaneously through their respective compartments of the electrochemical cell. A potential was applied across the anode and cathode sufficient to give a current of 5.5 A (current density 0.85 $kA/m^2$) for 80 minutes. A coulombic efficiency of 96% for the reduction of 65% of the titanium(IV) to titanium(III) was observed. After a further 40 minutes of electrolysis the coulombic efficiency was 82% and the conversion was 82%.

| Summary | |
|---|---|
| Cell Conditions | |
| Electrode area | 64 $cm^2$, |
| Anode | Platinized titanium |
| Cathode | Copper |
| Membrane | Nafion TM 423 |
| Current | 5.5 A (current density 0.85 $kA/m^2$) |
| temperature | 60 C. |
| cell voltage | 2-4 V |
| electrolyte velocity | 0.055 m/s |
| Electrolyte | Concentration (M) |
| titanium (IV) | 0.4 |
| methanesulfonic acid | 3.5 |

Coulombic efficiency at 65% conversion was 96%. Coulombic efficiency at 82% conversion was 82%.

EXAMPLE 2

The same electrolysis was repeated under the following conditions:

| Cell conditions | |
|---|---|
| Electrode area | 100 $cm^2$, |
| Anode | Platinum-iridium coated titanium |
| Cathode | graphite |
| Membrane | Nafion TM 417 |
| Current | 19.4 A (current density 1.94 $kA/m^2$) |
| temperature | 60 C. |
| cell voltage | 2-4 V |
| electrolyte velocity | 0.107 m/s |
| Electrolyte | Concentration (M) |
| titanium (IV) | 0.92 |
| methanesulfonic acid | 3.5 |

Coulombic efficiency at 50% conversion was 70% after 160 minutes of electrolysis.

EXAMPLE 3

The same electrolysis was repeated under the following conditions:

| Cell Conditions | |
|---|---|
| Electrode area | 100 $cm^2$, |
| Anode | Platinum-iridium coated titanium |
| Cathode | titanium |
| Membrane | Nafion TM 417 |
| Current | 19.4 A (current density 1.94 $kA/m^2$) |
| temperature | 60 C. |
| cell voltage | 2-4 V |
| electrolyte velocity | 0.107 m/s |
| Electrolyte | Concentration (M) |
| titanium (IV) | 0.91 |

| -continued | |
|---|---|
| methanesulfonic acid | 3.5 |

Coulombic efficiency at 50% conversion was 72% after 140 minutes of electrolysis.

EXAMPLE 4

Example 1 was repeated under the following conditions:

| Cell Conditions | |
|---|---|
| Electrode area | 100 cm$^2$, |
| Anode | Platinum-iridium coated titanium |
| Cathode | graphite |
| Membrane | Nafion ™ 417 |
| Current | 29.8 A (current density 2.98 kA/m$^2$) |
| temperature | 60 C. |
| cell voltage | 2-4 V |
| electrolyte velocity | 0.356 m/s |
| Electrolyte | Concentration (M) |
| titanium (IV) | 0.89 |
| methanesulfonic acid | 3.5 |

Coulombic efficiency at 53% conversion was 89% after 120 minutes of electrolysis. Coulombic efficiency at 67% conversion was 53% after 180 minutes of electrolysis.

EXAMPLE 5

Simultaneous reduction of titanium and oxidation of cerium

Preparation of the catholyte: 192 parts of titanium oxysulfate was dissolved in a solution of methanesulfonic acid (1000 parts) to give a solution of 0.8M titanium(IV) in methanesulfonic acid (3.5M). The anolyte was prepared by suspending 273 parts of cerium(III) carbonate pentahydrate in water (400 parts) and adding methanesulfonic acid (625 parts) to give a solution of 1.0 molar cerium(III) methanesulfonate in 3.5 molar methanesulfonic acid.

The electrolysis was carried out in a small plate and frame cell equipped with an anode of plantinized titanium, a cathode of copper and an ion exchange membrane (Nafion ™ 417). The respective anolyte and catholyte were pumped simultaneously through their respective compartments of the electrochemical cell. A potential was applied across the anode and cathode sufficient to give a current of 12.9 A (current density 1.0 kA/m$^2$) for 750 minutes. A coulombic efficiency of 92% with a conversion of 68% of the titanium(IV) to titanium(III) was obtained. After the same period of time the conversion of cerium(III) to cerium(IV) was 55% and the coulombic efficiency was 87%.

| Cell Conditions | |
|---|---|
| cathode area | 128 cm$^2$, |
| anode area | 128 cm$^2$, |
| Anode | Platinum coated titanium |
| Cathode | copper |
| Membrane | Nafion ™ 417 |
| Current | 12.9 A (current density 1.0 kA/m$^2$) |
| temperature | 60 C. |
| cell voltage | 2-4 V |
| anolyte velocity | 0.1 m/s |
| catholyte velocity | 0.1 m/s |
| catholyte | Concentration (M) |

| -continued | |
|---|---|
| titanium (IV) | 0.80 |
| methanesulfonic acid anolyte | 3.5 |
| cerium (III) methanesulfonate | 0.96 |
| methanesulfonic acid | 3.5 |

Titanium(III) coulombic efficiency at 68% conversion was 92%. Cerium (IV) coulombic efficiency at 55% conversion was 87%.

EXAMPLE 6

Example 5 was repeated under the following conditions:

| Cell Conditions | |
|---|---|
| cathode area | 100 cm$^2$, |
| anode area | 100 cm$^2$, |
| Anode | Platinum-iridium coated titanium |
| Cathode | graphite |
| Membrane | Nafion ™ 417 |
| Current | 19.7 A (current density 1.97 kA/m$^2$) |
| temperature | 60 C. |
| cell voltage | 2-4 V |
| anolyte velocity | 0.35 m/s |
| catholyte velocity | 0.35 m/s |
| catholyte | Concentration (M) |
| titanium (IV) | 0.88 |
| methanesulfonic acid anolyte | 3.5 |
| cerium (III) methanesulfonate | 0.94 |
| methanesulfonic acid | 3.5 |

Titanium(III) coulombic efficiency at 55% conversion was 66%. Cerium (IV) coulombic efficiency at 50% conversion was 60%.

Chemical Reductions

EXAMPLE 7

A solution of titanium(III) in methanesulfonic acid, prepared as described in Example 1 above, was pre-heated to 60° C. in a jacketed glass vessel (with a capacity 2 litres) and agitated. To the pre-heated solution 8.35 grams of p-nitrotoluene was added. The resulting two phase mixture was vigorously agitated for 35 minutes until all the p-nitrotoluene was converted to p-aminotoluene with a chemical yield of 98% and a selectivity of titanium(III) use of 90%.

EXAMPLE 8

A solution of titanium(III) in methanesulfonic acid, prepared as described in Example 2 above, was pre-heated to 60° C. in a jacketed glass vessel (with a capacity 2 litres) and agitated. To the pre-heated solution 42.79 grams of diphenyl sulfoxide was added, the resulting two phase mixture was vigorously agitated for 55 minutes until all the diphenyl sulfoxide was converted to diphenyl sulfide with a chemical yield of 99% and a selectivity of titanium(III) use of 90%. After separation, the catholyte was recycled to the electrochemical cell (the coulombic efficiency was 86%). After subsequent re-electrolysis the chemical reaction was completed a second and third time with equivalent results to those described above.

Trivalent titanium can also be used in the following chemical reactions:

1) nitrobenzenes to anilines, where the nitro benzene can be substituted at the o, m, or p position by any of the following groups: hydroxy, methoxy, ethoxy, phenoxy etc, chloro or other halogen, for example nitroquinoline, nitroisoquinolines, nitrocumolines, etc;

2) nitro substituted polycyclic aromatic hydrocarbons such as nitronaphthalene to aminonaphthalene;

3) benzidines such as 2,3'-dinitrobenzodine to 2,3'-diaminobenzidine;

4) 3-nitrohydroxybenzoic acid to 3-amino-4-hydroxybenzoic acid;

5) alkenes derivatives to alkyl analogues such as maleic acid and fumaric acid to succinc acid;

6) nitroparaffins to primary and secondary amines;

7) alkyl hydroxylamines to ketones;

8) O-nitro anilines, cyclised to imidizoles;

9) ketones to alcohols;

10) cylisation of

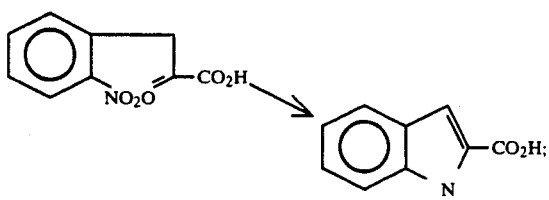

11) nitroimidozole to aminoimidozole;

12) coupling process: 4-methoxy-2-nitrotoluene to 2-amino-4-methoxybenzaldehyde

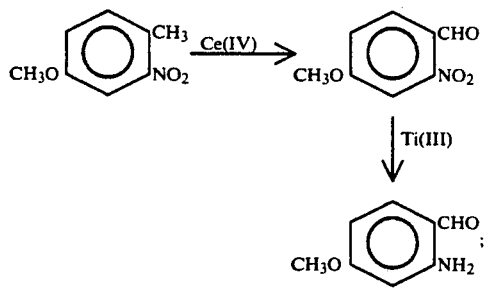

13) diphenylsulfoxide to diphenylsulfide;

14) acetophenone oxime or 1-bromoacetophenone to acetophenone;

15) 3-chloro-2-norboranone to norcamphor;

16) hydroxylamine reduction

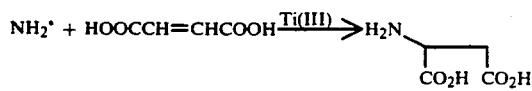

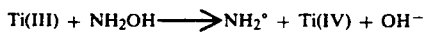

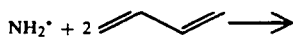

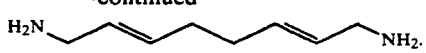

An advantage of the invention is that after the reduction of an organic compound, trivalent titanium is converted into tetravalent titanium. It is then possible to recycle the electrolyte into a cell to regenerate the reducing agent consisting of trivalent titanium.

Another noted advantage of the invention is that in the case of a simultaneous reduction of titanium(IV) and oxidation of cerium(III), the same acid can be used in both compartments of the cell. Since the solubility of the cerium and titanium ions is high in the acid used, it is possible to use a high current density with high faradaic/coulombic efficiency. Another advantage results from the fact of having the same acid which eliminates the problem of transport of anions through the membrane. The high solubility and the nature of the acid also ensures high reaction speeds.

We claim:

1. An electrolyte comprising a tetravalent salt of titanium dissolved in a solution of methanesulfonic acid.

2. An electrolyte according to claim 1, which is a catholyte.

3. A catholyte according to claim 2, wherein said tetravalent salt of titanium is selected from the group consisting of titanium oxysulfate, titanium chloride and titanium oxymethanesulfonate.

4. A catholyte according to claim 2, wherein said methanesulfonic acid is in solution in water.

5. A catholyte according to claim 2, wherein the concentration of said tetravalent salt of titanium is about 0.4 to 1M.

6. A catholyte according to claim 2, wherein the concentration of said methanesulfonic acid is about 0.2 to 10M.

7. A catholyte according to claim 6, wherein the concentration of said methanesulfonic acid is about 2-5M.

8. An electrolytic process for the reduction of titanium(IV) to titanium(III) wherein said process is carried out with a catholyte comprising a tetravalent salt of titanium dissolved in a solution of methanesulfonic acid.

9. An electrolytic process for the reduction of titanium(IV) to titanium(III) which comprises providing an electrochemical cell as defined in claim 8, and applying sufficient electrical current at the anode and cathode to substantially reduce tetravalent titanium into trivalent titanium.

10. Process according to claim 9, which comprises applying a current density of 100 to 10,000 $Am^{-2}$.

11. Process according to claim 10, which comprises applying a current density of 500 to 4000 $Am^{-2}$.

12. In an electrolytic process for the simultaneous reduction of titanium(IV) to titanium(III) and oxidation of cerium(III) to cerium(IV), said process occurring in the same electrolytic cell in which anolyte and catholyte are separated by a membrane or a diaphragm, the improvement wherein said anolyte comprises a cerium(III) salt in solution of an acid and said catholyte is as defined in claim 1.

13. Process according to claim 12, wherein said acid is methanesulfonic acid.

14. An electrolyte comprising of 0.4 to 1M titanium as a tetravalent salt in a solution of 0.2 to 10 M methanesulfonic acid.

* * * * *